United States Patent
Simmons

(10) Patent No.: US 9,904,646 B2
(45) Date of Patent: Feb. 27, 2018

(54) VIRTUAL GENERAL PURPOSE INPUT/OUTPUT FOR A MICROCONTROLLER

(71) Applicant: Microchip Technology Incorporated, Chandler, AZ (US)

(72) Inventor: Michael Simmons, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 748 days.

(21) Appl. No.: 13/627,378

(22) Filed: Sep. 26, 2012

(65) Prior Publication Data

US 2013/0080677 A1 Mar. 28, 2013

Related U.S. Application Data

(60) Provisional application No. 61/539,703, filed on Sep. 27, 2011.

(51) Int. Cl.
*G06F 13/00* (2006.01)
*G06F 13/40* (2006.01)

(52) U.S. Cl.
CPC .................. *G06F 13/4068* (2013.01)

(58) Field of Classification Search
CPC .................................... G06F 13/4068
USPC ........................................ 710/316
See application file for complete search history.

(56) References Cited

U.S. PATENT DOCUMENTS

| | | | | |
|---|---|---|---|---|
| 5,136,188 A | * | 8/1992 | Ha et al. | 326/39 |
| 5,402,014 A | * | 3/1995 | Ziklik et al. | 326/37 |
| 5,736,867 A | * | 4/1998 | Keiser et al. | 326/38 |
| 6,055,619 A | | 4/2000 | North et al. | 712/36 |
| 6,998,871 B2 | * | 2/2006 | Mulligan | 326/37 |
| 2004/0155984 A1 | * | 8/2004 | Rhee | 348/705 |
| 2006/0168374 A1 | | 7/2006 | Wray et al. | 710/62 |

FOREIGN PATENT DOCUMENTS

| | | | | |
|---|---|---|---|---|
| EP | 2309395 A1 | 4/2011 | | G06F 13/40 |
| TW | 386193 B | 4/2000 | | G10H 7/00 |

OTHER PUBLICATIONS

Reference DS70058D Microchip Section 11. I/O Ports pp. 11-1 to 11-12 copywrite 2005.*
International Search Report and Written Opinion, Application No. PCT/US2012/057430, 10 pages, dated Mar. 13, 2013.
DS39711B, "Section 12. I/O Ports with Peripheral Pin Select (PPS)," Microchip Technology Incorporated, 24 pages, © 2007.
"dsPIC30F Family Reference Manual," Microchip Technology Incorporated, 12 pages, Dec. 31, 2006.

(Continued)

*Primary Examiner* — Paul R. Myers
(74) *Attorney, Agent, or Firm* — Slayden Grubert Beard PLLC

(57) ABSTRACT

A microcontroller includes a general purpose input/output (GPIO) port having a plurality of bits coupled to a plurality of external pins; a first set of registers for providing at least one of first control and data input/output functionality of the GPIO port; a second set of registers for providing at least one of second control and data input/output functionality of the GPIO port; and a multiplexer and associated select register for controlling the multiplexer to control said GPIO port through either said first or second register set.

22 Claims, 4 Drawing Sheets

(56) References Cited

OTHER PUBLICATIONS

Chinese Office Action, Application No. 201280047282.X, 7 pages, dated Jan. 25, 2016.
Taiwan Office Action, Application No. 101135669, 10 pages, dated Apr. 18, 2016.
Chinese Office Action, Application No. 201280047282.X, 4 pages, dated Jul. 28, 2016.
Taiwan Office Action, Application No. 101135669, 7 pages, dated Jan. 20, 2017.

* cited by examiner

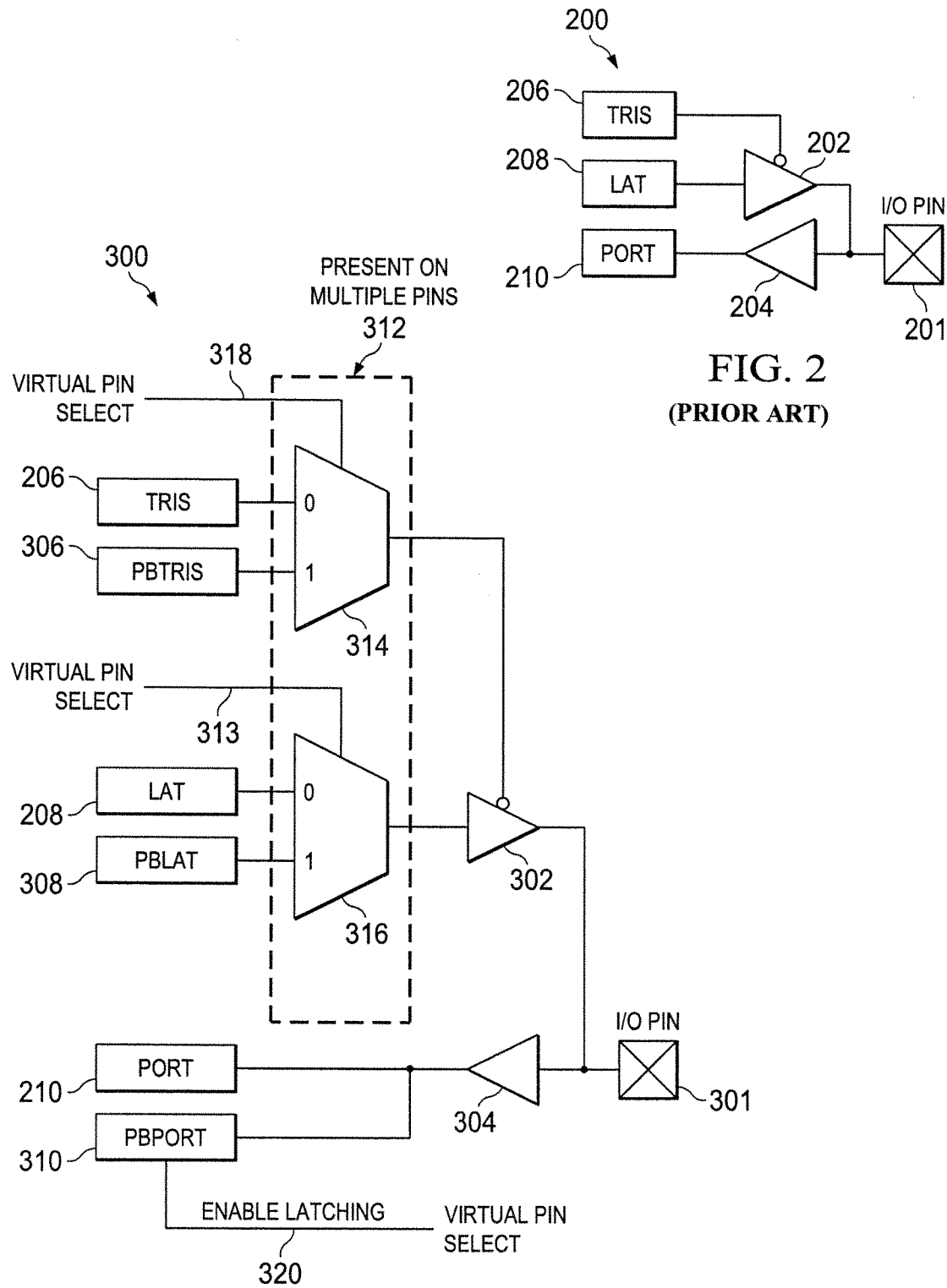

REGISTER 3-179: VIRTUAL PORT LAT REGISTER

| R/W-x | R/W-x | R/W-x | R/W-x | R/W-x | R/W-x | R/W-x | R/W-x |
|---|---|---|---|---|---|---|---|
| PBLAT7 | PBLAT6 | PBLAT5 | PBLAT4 | PBLAT3 | PBLAT2 | PBLAT1 | PBLAT0 — 308 |
| bit 7 | | | | | | | bit 0 | bit 7-0 PBLAT [7:0] VIRTUAL PORT I/O OUTPUT LATCH REGISTER bits

REGISTER 3-180: VIRTUAL PORT PORT REGISTER

| R/W-x | R/W-x | R/W-x | R/W-x | R/W-x | R/W-x | R/W-x | R/W-x |
|---|---|---|---|---|---|---|---|
| PBPORT7 | PBPORT6 | PBPORT5 | PBPORT4 | PBPORT3 | PBPORT2 | PBPORT1 | PBPORT0 — 310 |
| bit 7 | | | | | | | bit 0 | bit 7-0 PBPORT[7:0]: VIRTUAL PORT I/O VALUE bits

NOTE 1: WRITES TO PBPORT ARE ACTUALLY WRITTEN TO THE CORRESPONDING PBLAT REGISTER. VALUE IN REGISTER IS UPDATED WITH ACTUAL I/O PIN VALUES

REGISTER 3-181: VIRTUAL PORT TRIS REGISTER

| R/W-1 | R/W-1 | R/W-1 | R/W-1 | R/W-1 | R/W-1 | R/W-1 | R/W-1 |
|---|---|---|---|---|---|---|---|
| PBTRIS7 | PBTRIS6 | PBTRIS5 | PBTRIS4 | PBTRIS3 | PBTRIS2 | PBTRIS1 | PBTRIS0 — 306 |
| bit 7 | | | | | | | bit 0 | bit 7-0 PBTRIS [7:0]: VIRTUAL PORT I/O TRI-STATE CONTROL bits

---

R = READABLE bit
W = WRITABLE bit
-n = VALUE AT RESET
1 = bit IS SET
0 = bit IS CLEARED
U = UNIMPLEMENTED bit, READ AS '0'
x = bit IS UNKNOWN

FIG. 5

VIRTUAL GENERAL PURPOSE INPUT/OUTPUT FOR A MICROCONTROLLER

CROSS-REFERENCE TO RELATED APPLICATIONS

This application claims priority from U.S. Provisional Patent Application Ser. No. 61/539,703 filed Sep. 27, 2011, titled "VIRTUAL GENERAL PURPOSE INPUT/OUTPUT FOR A MICROCONTROLLER," which is hereby incorporated by reference in its entirety as if fully set forth herein.

BACKGROUND OF THE INVENTION

Technical Field

The present disclosure relates to microcontrollers and, in particular, to general purpose input/output ports in microcontrollers.

Description of the Related Art

A general purpose input/output (GPIO) port is generally understood as a parallel digital input/output port of a microcontroller. With current microcontrollers, GPIO functions are organized by ports (A, B, C, etc.), with each port having a set of registers input/output registers to control it. Furthermore, to control whether the port is used for digital input or digital output, a direction register such as a tri-state control register can be provided. Increasingly, microcontrollers are "low pin count" devices.

When, as a consequence, a large number of peripherals are multiplexed onto each pin, it is unlikely that more than one to three GPIO functions will be available on any given port, once a user allocates the pins necessary for dedicated pin functions, such as UART (universal asynchronous receiver/transmitter), SPI (serial peripheral interface), I2C (Inter-integrated circuit), etc. This means that when the user wants a coherent (atomic, i.e., the ability to read or write the set of GPIO pins with a single CPU instruction) set of GPIO pins with more than a couple of pins, they must access multiple registers to drive data out on or sample data from those pins. This leads to limitations, such as the inability to drive all GPIO pins high at the same time, or to sample all GPIO pins at the same time.

SUMMARY

These and other drawbacks in the prior art are overcome in large part by a system and method according to embodiments of the present invention.

A microcontroller according to embodiments includes a general purpose input/output (GPIO) port having a plurality of bits coupled to a plurality of external pins; a first set of registers for providing at least one of first control and data input/output functionality of the GPIO port; a second set of registers for providing at least one of second control and data input/output functionality of the GPIO port; and a multiplexer and associated select register for controlling the multiplexer to control said GPIO port through either said first or second register set.

In some embodiments, the first and second register set comprise a read register, a write register, and a direction control register. In some embodiments, the port comprises a controllable output driver having an output coupled with an external pin and an input driver having an input coupled with the external pin. In some embodiments, the first and second read register are coupled through a first multiplexer with the output of the input driver, the first and second write register are coupled through a second multiplexer with the input of the output driver, and the first and second direction control register are coupled through a third multiplexer with a control input of the output driver. In some embodiments, the microprocessor further includes a peripheral pin select unit operable to programmably assign an external pin to the second functionality of the GPIO.

An input/output configuration for a processor according to some embodiments include a first plurality of registers comprising a first general purpose input/output configuration selectively coupled to an external pin of the processor; a second plurality of registers comprising a second general purpose input/output configuration selectively coupled to the external pin; and a control register operably coupled to control switching between the first general purpose input/output configuration and the second general purpose input/output configuration. In some embodiments, the input/output configuration includes at least one multiplexer for receiving control inputs from the control register for selecting between the first general purpose input/output configuration and the second general purpose input/output configuration. In some embodiments, the first plurality of registers includes a first read register, a first write register, and a first direction control register; and the second plurality of registers includes a second read register, a second write register, and a second direction control register. In some embodiments, the at least one multiplexer includes a first multiplexer for selecting between the first direction control register and the second direction control register; and a second multiplexer for selecting between the first write register and the second write register. In some embodiments, the input/output configuration includes a controllable output driver having an output coupled with the external pin and an input driver having an input coupled with the external pin.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 2 is a diagram illustrating a conventional GPIO port.

FIG. 3 is a diagram illustrating a GPIO port in accordance with embodiments of the invention.

FIG. 5 illustrates exemplary registers for use with a virtual port in accordance with embodiments.

DETAILED DESCRIPTION

Figure 1:
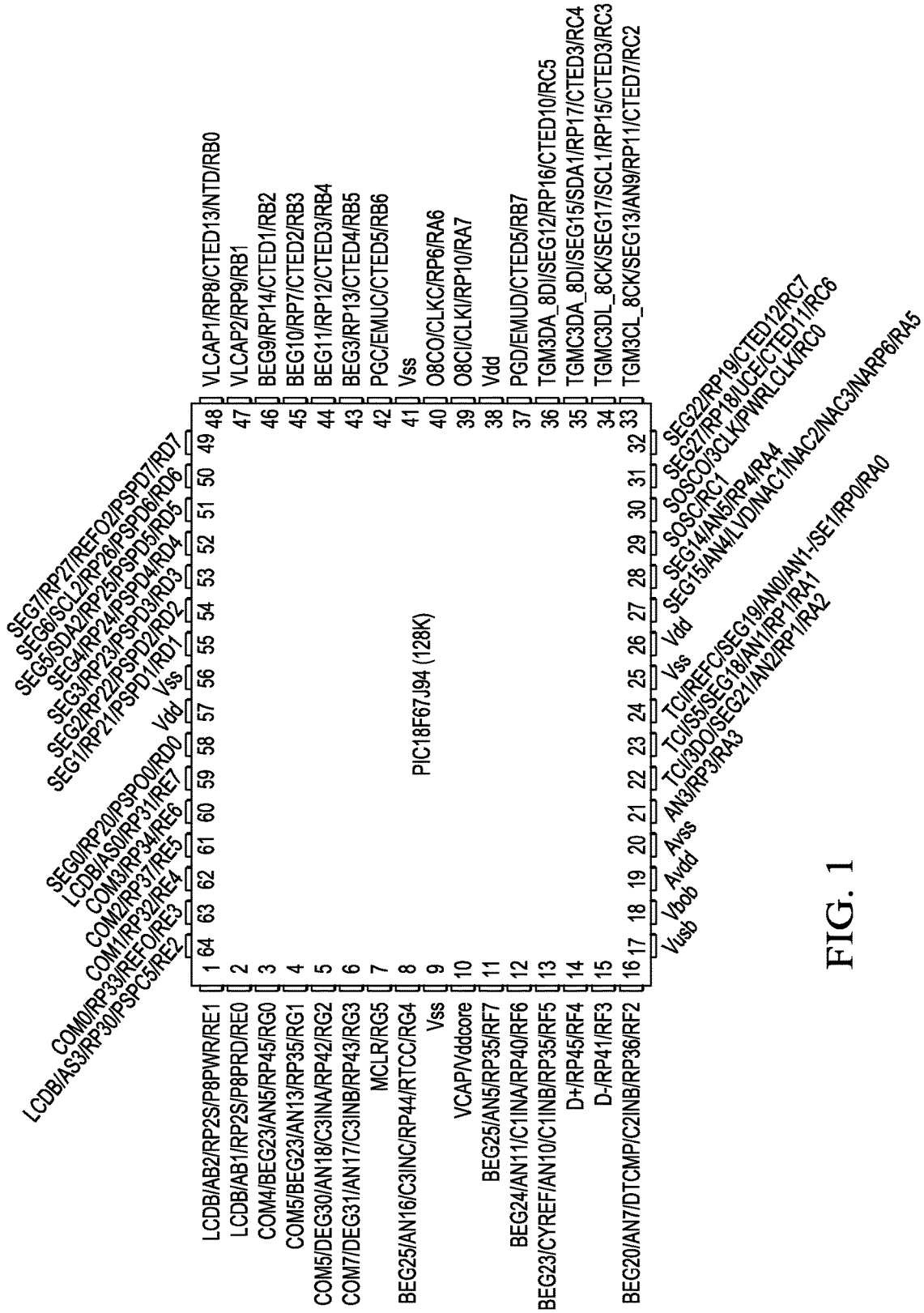
FIG. 1 is a diagram illustrating an exemplary microcontroller pin configuration.

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

As will be explained in greater detail below, according to various embodiments, a user can map GPIO pins that are spread across multiple physical ports to a single software port, called a Virtual Port. That is, in some embodiments, a Virtual Port is constructed by mapping unrelated pins to a single "port."

In some embodiments, the mapping employs a remappable pin function, such as the Peripheral Pin Select (PPS) infrastructure, available from Microchip, which provides flexible multiplexing between pins and peripherals, and also employs a dedicated set of extra GPIO registers. It then becomes possible to simultaneously drive or sample multiple GPIOs even though they do not necessarily belong to the same originally assigned port. In other applications, the same port may be used in different configurations that require extensive re-programming of that port. According to an embodiment, at least a second set of registers allows users to set two or more configurations of a GPIO port which can be switched by simply setting at least one bit of a select register.

Turning now to the drawings and, with particular attention to FIG. 1, a diagram of an exemplary microcontroller that can be used in accordance with the teachings of the disclosure is shown. The microcontroller 100 may be embodied as a PIC18F67J94, available from Microchip Technologies, Inc., or a similar microcontroller or processor. Microcontroller 100 includes a plurality of pins, many of which are used to implement more than one function. In the example illustrated, pins with the designation "R" are remappable using a Peripheral Pin Select functions. Peripheral Pin Select allows a programmer to map the I/O of most peripherals to a selection of pins.

However, with low pin counts and increasing number of peripherals, users are often constrained in their GPIO to "leftover" pins. Even with PPS (Peripheral Pin Select), board layout may constrain pin selection on a device. If a multi-pin GPIO "port" is required to implement a protocol or control, and all of the pins are not on the same physical port (i.e.—Port A, B, etc.), then multiple instruction cycles are required to read the port, for example with a read register (PORT), write the port, for example with a write register (LAT), or switch directionality of the port, for example with a tri-state register (TRIS) on these pins. With conventional systems, it is impossible to keep cycle coherency on the GPIO port for reads and writes.

For example, shown in FIG. 2 is a conventional GPIO port 200. Shown is I/O pin 201, read driver 204 and read register 210 (PORT); and tri-state write driver 202, with a write register (LAT) 208 and select register 206 (TRIS). In operation, the register 206 is used to select the input or output functioning or directionality of the port 200.

According to an embodiment, a virtual port allows a user to allocate any possible GPIO pin to a virtual PORT. As shown in FIG. 3, an existing GPIO port is assigned a shadow function which can be activated by merely setting a single bit switching the functionality from an original configured port to the configuration set in the register assigned to the virtual function.

More particularly, FIG. 3 illustrates an exemplary GPIO virtual port structure according to an embodiment. As shown, the port 300 includes pin 301, drivers 302, 304, and read (PORT) register 210, write (LAT) register 208, and select (TRIS) register 206, which function similarly to conventional ports. However, according to embodiments, the virtual port 300 includes virtual write (PBLAT) register 306, virtual read (PBPORT) register 310, and virtual select (TRIS) register 308. Multiplexers 314, 316 allow users to select between the "real" or virtual port functions. More particularly, in standard operation, the standard port configuration may be used. By selecting using the virtual pin select line(s) 318, 313, 320, a user can select the virtual port function.

The additional logic requires only a minimum of real estate, thus, die cost is kept small. For example, with 40 GPIO pins and 8-pin virtual port, the additional logic requires about 1K gates. However, this requirement can be even further reduced when using an existing PPS.

Generally, the GPIO is considered as a dedicated pin function, and not treated as a peripheral. However, according to various embodiments, the GPIO is treated like any other mappable peripheral. As will be discussed in greater detail below, according to some embodiments, using a remappable pin function infrastructure, such as the PPS infrastructure, which allows for multiplexing between any or almost any pin and any or almost any peripheral, a new "GPIO peripheral" is added to the list of re-mappable peripherals. That is, with a remappable pin function such as PPS, the virtual port looks just like another peripheral device. Within this GPIO peripheral, a new set of dedicated GPIO registers functions identically to pin-based GPIO functions. In some embodiments, this additional GPIO peripheral can be placed as the lowest priority re-mappable peripheral, right above the pin-based GPIO pin functions (which are not part of the re-mappable pin function set), thereby making them behave like the pin-based GPIO pin functions (look and feel), but independent of the physical pin they are mapped to. Consequently, a group of disjointed (i.e.—spread across multiple GPIO "ports") pins can be transformed into what looks like an atomic (i.e.—all on the same GPIO "port") group of pins with minimal additional logic.

Figure 4:
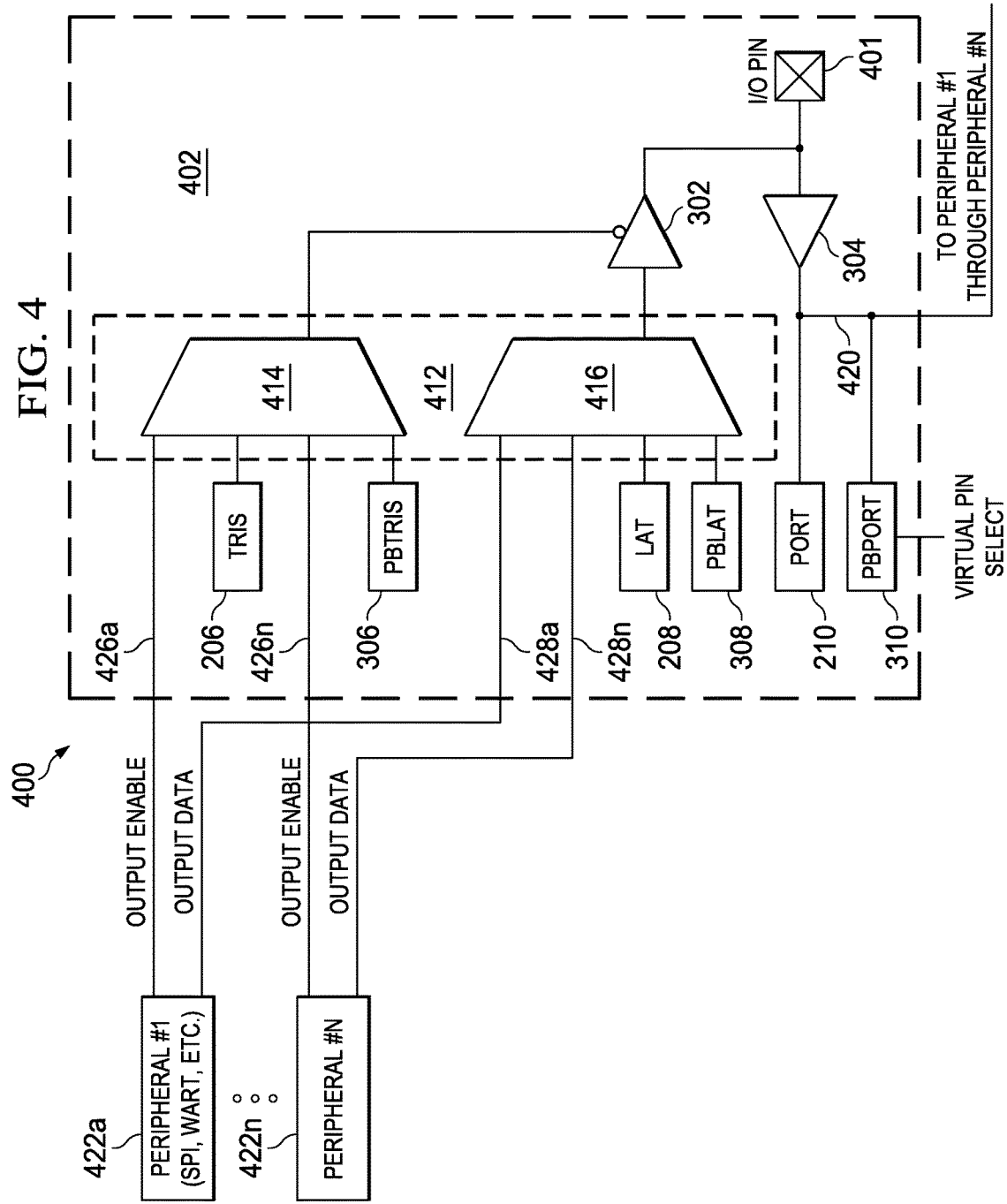
FIG. 4 is a diagram illustrating a GPIO port in accordance with embodiments of the invention.

Turning now to FIG. 4, a diagram 400 showing virtual GPIO in a remappable pin function environment is shown.

The environment 400 includes GPIO virtual port structure 402 and peripherals 422a-422n. The GPIO virtual port structure includes pin 401, drivers 302, 304, and read (PORT) register 210, write (LAT) register 208, and select (TRIS) register 206, which function similarly to conventional ports and as described above with reference to FIG. 3. In addition, the virtual port 402 includes virtual write (PBLAT) register 306, virtual read (PBPORT) register 310, and virtual select (TRIS) register 308. Multiplexers 414, 416 allow users to select between the "real" or virtual port functions in a manner similar to that discussed above. By selecting the virtual pin select line(s) (not shown), a user can select the virtual port function.

In addition, in a remappable pin function environment, the multiplexers 414, 416 receive inputs from peripherals 422a, 422n. In particular, in some embodiments, the output enable lines 426a, 426n are provided to multiplexer 414 to enable writing to the pin 401, and output data lines 428a . . . 428n are provided to multiplexer 416 to write data to the pin.

According to various embodiments, a set of separate PBLAT, PBPORT and PBTRIS registers is implemented. For example, shown in FIG. 5 are 8-bit wide LAT (write) 308, port (read) 310, and tris (select) 306 registers for a PIC18 microcontroller. Register width would be the native data width of the architecture, so that register reads/writes are atomic.

Although the foregoing specification describes specific embodiments, numerous changes in the details of the embodiments disclosed herein and additional embodiments will be apparent to, and may be made by, persons of ordinary skill in the art having reference to this description. In this context, the specification and figures are to be regarded in an illustrative rather than a restrictive sense, and all such modifications are intended to be included within the scope of this disclosure. Accordingly, the scope of the present disclosure should be determined by the following claims and their legal equivalents.

What is claimed is:

1. A microcontroller comprising:
a plurality of general purpose input/output (GPIO) ports each having a plurality of bits each bit having a predefined association with one of a plurality of external pins;
a first set of registers being directly programmable and operable to provide a first GPIO port control and digital data input/output functionality for all bits of one of the plurality of GPIO ports through associated external pins;
a second set of registers being directly programmable and operable to provide a second GPIO port control and digital data input/output functionality for all bits of the one of the plurality of GPIO ports through the associated external pins;
a multiplexer and associated select register configured to control the multiplexer to control a GPIO function of any of the associated external pins of the one of the plurality of GPIO ports depending on a setting of the select register through either said first or second register set or at least one of a plurality of peripheral devices of the microcontroller.

2. The microcontroller according to claim 1, wherein the first and second register set comprise a read register, a write register, and a direction control register.

3. The microcontroller according to claim 2, wherein the port comprises a controllable output driver having an output coupled with an external pin and an input driver having an input coupled with the external pin.

4. The microcontroller according to claim 3, wherein the first and second read register are coupled with the output of the input driver, the first and second write register are coupled through a first multiplexer with the input of the output driver, and the first and second direction control register are coupled through a second multiplexer with a control input of the output driver.

5. The microcontroller according to claim 1, further comprising a peripheral pin select unit operable to programmably assign an external pin to a second functionality of a GPIO.

6. The method according to claim 1, further comprising providing a peripheral pin select unit operable to programmably assign bits of the second set of registers to bits of general input/output (GPIO) ports of the microcontroller.

7. An input/output configuration for a processor, comprising:
a first plurality of registers being directly programmable and comprising a first general purpose input/output (GPIO) configuration selectively coupled to associated external pins representing bits of a GPIO port of the processor;
a second plurality of registers being directly programmable and comprising a second general purpose input/output configuration selectively coupled to the associated external pins; and
a control register operably coupled to control switching between the first general purpose input/output configuration and the second general purpose input/output configuration.

8. The input/output configuration according to claim 7, further including at least one multiplexer for receiving control inputs from the control register for selecting between the first general purpose input/output configuration and the second general purpose input/output configuration.

9. The input/output configuration according to claim 8, wherein the first plurality of registers comprises a first read register, a first write register, and a first direction control register; and the second plurality of registers comprises a second read register, a second write register, and a second direction control register.

10. The input/output configuration according to claim 9, wherein the at least one multiplexer comprises a first multiplexer for selecting between the first direction control register and the second direction control register; and a second multiplexer for selecting between the first write register and the second write register.

11. The input/output configuration according to claim 10, further comprising a controllable output driver having an output coupled with the external pin and an input driver having an input coupled with the external pin.

12. A method for operating a microcontroller, comprising:
providing an input/output unit within the microcontroller having a plurality of bits coupled to a plurality of external pins;
providing a first set of registers within the microcontroller operable to provide a primary general purpose digital input/output (GPIO) functionality for a GPIO port through the input/output unit;
providing a second set of registers within the microcontroller operable to provide a secondary general purpose digital input/output functionality for the GPIO port through the input/output unit;
programming a select register within the microcontroller to select one of the first register set, the second register set or one of a plurality of peripheral units within the microcontroller;

controlling a multiplexer through the select register to control said input/output unit through the first register set, the second register set or the one of a plurality of peripheral units;

directly controlling a signal on at least one external pin of said plurality of external pins either through directly programming the first register set or the second register set.

13. The method according to claim 12, wherein the first and second register set comprise a read register, a write register, and a direction control register.

14. The method according to claim 13, wherein the input/output unit comprises a controllable output driver having an output coupled with an external pin and an input driver having an input coupled with the external pin.

15. The method according to claim 14, wherein the first and second read register are coupled with the output of the input driver, the first and second write register are coupled through a first multiplexer with the input of the output driver, and the first and second direction control register are coupled through a second multiplexer with a control input of the output driver.

16. A microcontroller comprising:
at least one pin based input/output driver unit having a plurality of bits coupled to an associated set of external pins and comprising an associated first set of registers being directly programmable and configured to provide a primary general purpose input/output (GPIO) control and digital data input/output functionality through the associated set of external pins, and
a second set of registers being directly programmable and configured to provide a secondary GPIO control and data input/output functionality through the associated set of external pins;
wherein at least some of the plurality of external pins comprise a multiplexer unit coupled with at least an output driver of the input/output driver unit and comprises an associated select register for controlling the multiplexer unit to couple an associated external pin to be controlled through the multiplexer by at least a first output control register of the first set of registers controlling the primary GPIO function or by at least a second output control register of the second set of registers controlling the secondary GPIO function or by a function of at least one peripheral device of the microcontroller.

17. The microcontroller according to claim 16, wherein the first and second set of registers each further comprise a tri-state control register.

18. The microcontroller according to claim 16, wherein the first and second register set each comprise a read register, a write register, and a direction control register.

19. The microcontroller according to claim 18, wherein the at least one pin based input/output driver unit comprises a controllable output driver having an output coupled with an external pin and an input driver having an input coupled with the external pin.

20. The microcontroller according to claim 19, wherein the first and second read register are coupled through a first multiplexer with the output of the input driver, the first and second write register are coupled through a second multiplexer with the input of the output driver, and the first and second direction control register are coupled through a third multiplexer with a control input of the output driver.

21. The microcontroller according to claim 16, wherein bits of the second set of registers can be assigned to external pins associated with different pin based GPIO ports.

22. The microcontroller according to claim 21, wherein external pins associated with more than one GPIO port can be controlled synchronously through the second set of registers.

* * * * *